Figure 1:
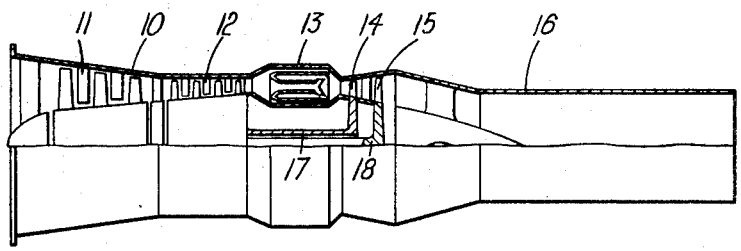

May 12, 1964   A. H. LEFEBVRE ETAL   3,132,483
GAS TURBINE ENGINE COMBUSTION CHAMBER
Filed April 24, 1961

Arthur Henry Lefebvre
Herbert Frank Smith
Inventors

By
Fred. E. Shoemaker and
Fred L. Witherspoon, Jr. Attorney

United States Patent Office 3,132,483
Patented May 12, 1964

3,132,483
GAS TURBINE ENGINE COMBUSTION CHAMBER
Arthur Henry Lefebvre, Mackworth, Derby, and Herbert Frank Smith, Alvaston, Derby, England, assignors to Rolls-Royce Limited, Derby, England, a company of Great Britain
Filed Apr. 24, 1961, Ser. No. 104,903
Claims priority, application Great Britain Apr. 25, 1960
2 Claims. (Cl. 60—39.65)

This invention concerns gas turbine engine combustion chambers.

The standard practice in a combustion chamber of a gas turbine engine has been to provide only a portion of the air required for combustion at, or upstream of, the fuel injection means of the combustion chamber. This portion has been known as the "primary air." The remainder of the air required for combustion (known as "secondary air") has been introduced into the combustion chamber downstream of the combustion zone to reverse the direction of flow of the combustion products in the combustion zone and to provide the additional air required to complete the combustion. "Tertiary" (or "dilution") air has also been supplied to the combustion chamber so as to cool down the products of combustion to a temperature suitable for operation of the turbine of the engine.

We have previously proposed the use of an annular combustion chamber in which are mounted two concentric annular flame tubes. In this prior proposal, however, the primary air was supplied to the flame tubes on both sides of the fuel injection means therein. In order, however, to reach both sides of the fuel injection means it was necessary for at least some of the primary air to be sent along curved paths and this meant that, if excessive pressure losses were to be avoided, the curvature of the paths had to be as gentle as possible, whereby the combustion chamber was of substantial axial length.

According, therefore, to the present invention there is provided an annular combustion chamber for a gas turbine engine comprising two concentric annular flame tubes between which is disposed an annular air duct, said flame tubes and air duct extending axially of the combustion chamber and said air duct having a substantially straight through path for the flow of air therethrough, fuel injection means mounted in each flame tube, and primary air supply means for supplying each of the flame tubes with primary air from the said air duct, said primary air supply means serving to supply primary air to the flame tubes on one side only of the fuel injection means therein.

Preferably one or more interconnectors is provided between the flame tubes for flame propagation during ignition.

Preferably the flame tubes are supplied with all the air required for combustion through said primary air supply means, no secondary air being supplied to the flame tubes.

The air duct and flame tubes may be provided with common walls, the primary air supply means comprising apertures in said common walls.

The air duct is preferably adapted to be supplied with all the air required both for combustion of the fuel and for dilution of the products of combustion, the air duct communicating with both the flame tubes downstream of the combustion zones therein so as to supply the flame tubes with dilution air.

There may be a space between each flame tube and the adjacent wall of the combustion chamber, means being provided for supplying cooling air to each said space. Preferably the air duct communicates with said spaces so as to supply cooling air thereto.

Figure 2:
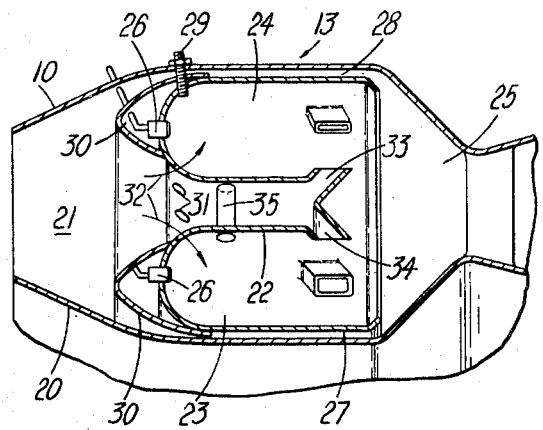

The invention is illustrated, merely by way of example, in the accompanying drawings, in which:

FIGURE 1 is a diagrammatic side elevation, partly in section, of an axial flow multi stage gas turbine engine provided with a combustion chamber according to the present invention, and FIGURE 2 is an enlarged section through the combustion chamber of FIGURE 1.

Referring to the drawings, a gas turbine, jet propulsion engine for an aircraft has an engine casing 10 within which are disposed in flow series a low pressure compressor 11, a high pressure compressor 12, an annular combustion chamber 13, a high pressure turbine 14, and a low pressure turbine 15, the turbine exhaust gases being discharged through a jet pipe 16.

The high and low pressure turbines 14, 15 are respectively mounted on, so as to drive, shafts 17, 18 on which are respectively mounted the high and low pressure compressors 12, 11, the shaft 18 being mounted concentrically within the shaft 17.

The annular combustion chamber 13 has an internal wall 20 which is substantially concentric with the engine casing 10. Air which has been compressed by the compressors 11, 12 is supplied to the space 21 between the casing 10 and wall 20 at the upstream end of the combustion chamber.

An axially extending annular air duct 22, having a substantially straight path for the air flowing therethrough, is mounted concentrically within the combustion chamber 13. The air duct 22 is disposed between two annular flame tubes 23, 24 which communicate with each other at their downstream ends. The products of combustion from the flame tubes 23, 24 are discharged to the annular outlet end 25 of the combustion chamber and so to the turbines 14, 15. Each of the flame tubes 23, 24 is provided with a ring of angularly spaced apart fuel injectors 26, the flame tube 24 being provided with fuel ignition means 29. At least one interconnector 35 is provided to propagate flame from flame tube 24 to flame tube 23 during ignition.

The flame tubes 23, 24 are spaced from the internal wall 20 and engine casing 10 by annular cooling air channels 27, 28 respectively, a minor proportion (e.g. 5%) of the air from the space 21 being directed past baffles 30 and into the channels 27, 28 so as to effect cooling of the casing 10 and wall 20.

The walls of the air duct 22 are provided with rings of angularly spaced apart apertures 31 whereby air supplied to the duct 22 passes into the flame tubes 23, 24 as indicated by the arrows 32 and undergoes a single reversal of direction therein. The air so supplied to the flame tubes 23, 24 constitutes all the air required for combustion, and, as will readily be seen, is supplied on one side only of the fuel injectors 26.

At its downstream end the air duct 22 is bifurcated into branches 33, 34 through which dilution air is supplied to the flame tubes 23, 24 downstream of the combustion zones therein.

It will be appreciated that in the combustion chamber shown in the drawings there is a substantially straight through path for all the air supplied to the combustion chamber 13 with the exception of the say, 5% of the air which flows to the cooling air channels 27, 28. This straight through path for the air arises from the fact that the primary air enters the flames tubes 23, 24 on one side only of the fuel injectors 26, no secondary air being employed, and the tertiary or "dilution" air is supplied from the axially extending duct 22. This straight through path enables the length of the combustion chamber shown in the drawings to be less than that of combustion chambers wherein it is necessary for the air supply to flow along curved paths.

We claim:

1. An annular combustion chamber for a gas turbine engine comprising spaced outer and inner concentric co-extensive casings, spaced outer and inner concentric co-extensive annular flame tubes mounted between said outer and inner casings, said outer flame tube having an inner wall bounding the combustion zone therein, and said inner flame tube having an outer wall bounding the combustion zone therein, said outer and inner walls bounding an annular axially extending air passage therebetween, primary air apertures in said outer wall and in said inner wall and establishing fluid flow communication between said air passage and each of said flame tubes, each of said primary air apertures being located closely adjacent the upstream end of the respective flame tube, said primary air apertures being the only apertures leading into the flame tubes for all of the air required for combustion in the flame tubes, said air passage communicating with each of said flame tubes downstream of the combustion zone therein and supplying the flame tubes with dilution air, fuel injection means mounted in the upstream end of each flame tube, said outer and inner casings having forward extensions extending upstream of said flame tubes and defining therebetween an annular diffusion section axially aligned with said air passage, said diffusion section having an open upstream end for receiving a supply of air for the flame tubes.

2. A combustion chamber as claimed in claim 1 in which said outer and inner walls of the air passage have upstream portions which diverge from one another in an upstream direction, and in which said primary air apertures are formed.

References Cited in the file of this patent

UNITED STATES PATENTS

| | | |
|---|---|---|
| 2,765,621 | Poulston et al. | Oct. 9, 1956 |
| 2,798,360 | Hazen | July 9, 1957 |
| 2,931,174 | Allen | Apr. 5, 1960 |
| 2,982,098 | Vickery | May 2, 1961 |
| 2,996,884 | Johnson et al. | Aug. 22, 1961 |

FOREIGN PATENTS

| | | |
|---|---|---|
| 620,270 | Great Britain | Mar. 22, 1947 |